INVENTOR
CONRAD REGINALD COOKE

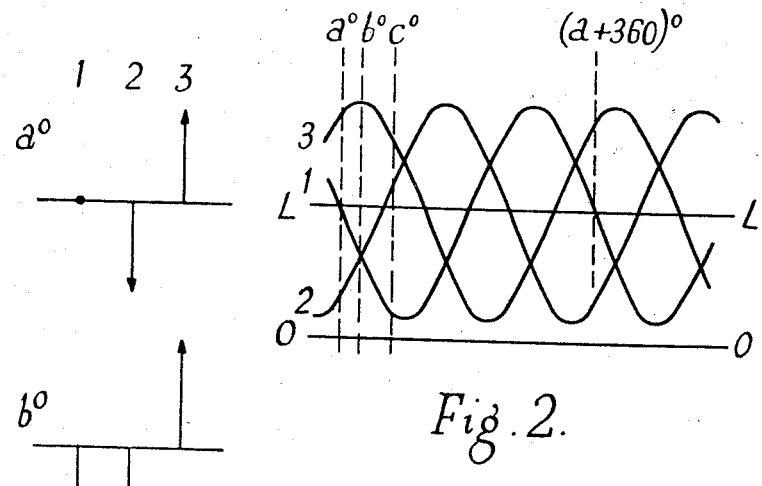
Fig. 1.
Fig. 2.
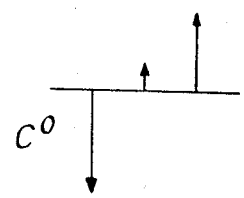
Fig. 3.

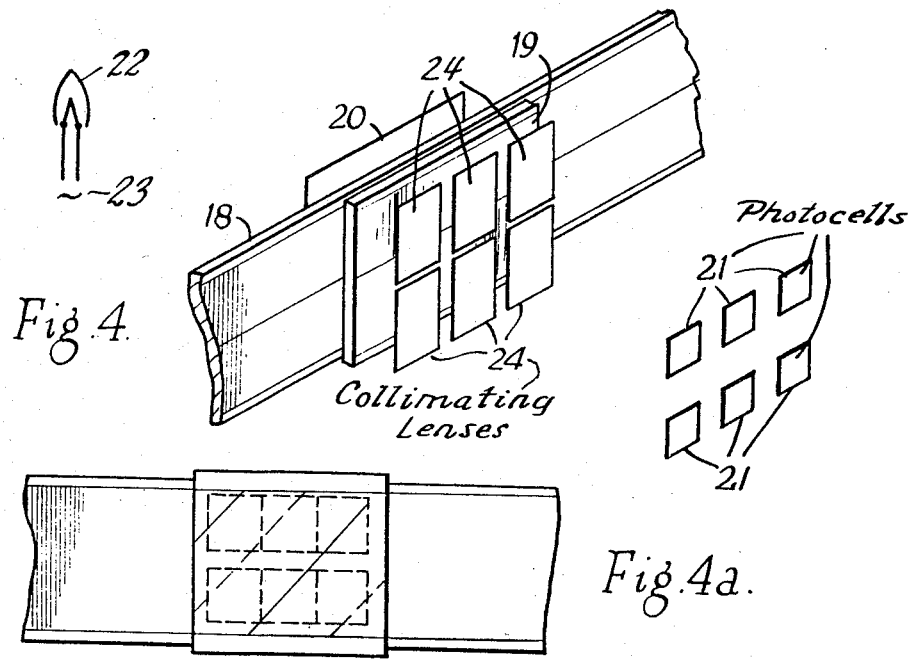
Fig. 4.
Fig. 4a.
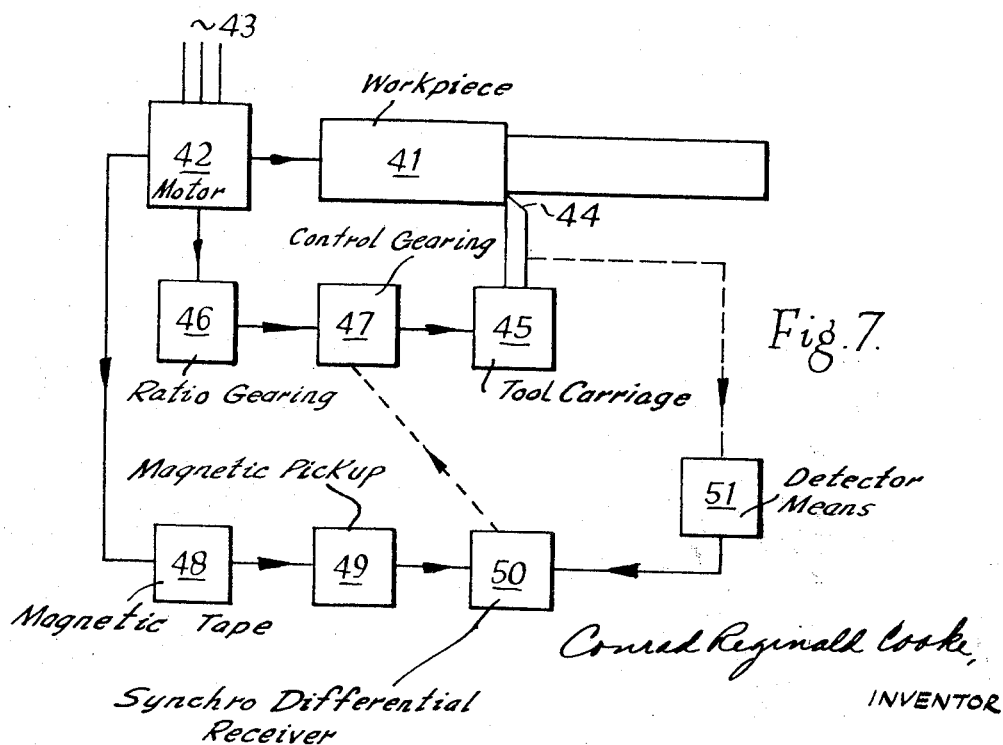
Fig. 7.

United States Patent Office 3,441,741
Patented Apr. 29, 1969

3,441,741
SYNCHRO RECEIVER RESPONSIVE TO THE RELATIVE MOVEMENT BETWEEN TWO GRATINGS
Conrad Reginald Cooke, 1 Court Drive, Shillingford, Oxford, England
Filed Sept. 28, 1964, Ser. No. 399,585
Int. Cl. H01j 39/12, 3/14, 5/16
U.S. Cl. 250—237     12 Claims

ABSTRACT OF THE DISCLOSURE

An apparatus which is responsive to relative movement between two members. Such movement is caused to produce relative movement between movement between wo optical or magnetic gratings which in turn produces a moving pattern of interference fringes. Movement of the fringe pattern is detected by means which produce a plurality of alternating current signals modulated in accordance with the fringe movement and these signals are modified to provide a set of signals capable of operating synchro type receivers which in turn may be used to exercise a control function on the relative movement of the members.

---

This invention relates to apparatus responsive to relative movement and is applicable to control systems for controlling the movement and/or displacement of a member such as, for example, a lath cutting tool.

In my U.S. Patent No. 3,230,380 and copending patent application Ser. No. 375,262, various systems for detecting and indicating the extent of relative movement between two relatively movable members are described, each of these systems comprising a pair of relatively movable superposed gratings which are arranged to produce a pattern of interference fringes, and detector means constituting a spatial frame of reference and producing a polyphase output signal which is phrase-displaced with respect to a datum or reference signal by a phase angle proportional to the displacement of the fringes from a reference position. In the above-mentioned patent application, a further system is described, in which the said output signal differs in frequency from the datum or reference signal by an amount proportional to the speed of movement of the fringes.

The present invention is concerned with a modification of the systems referred to above in which the output signals from the detector means are of the "three-phase synchro" type, that is to say in the form of a set of three signals in which the voltages are mutually in phase or anti-phase but of such amplitudes that their resultant is always zero.

It is important in this context that the difference between "synchro type" signals and ordinary "three phase" signals shall be clearly understood. This may be clarified by considering the difference between the operating conditions of a three-phase induction motor and a synchro receiver with similarly wound stators. In the three-phase motor the three stator windings are supplied with equal alternating current voltages mutually displaced in time phase by 120° and these produce a rotating magnetic field of constant amplitude which rotates at supply frequency. In the synchro receiver the stator is supplied with three unequal alternating current voltages which are either in phase or anti-phase relative to each other, and which together produce a stationary magnetic field of constant amplitude which alternates at supply frequency.

As the stator of the synchro receiver has windings similar to those of a three-phase motor, it is convenient to refer to the electric currents supplying them as "phases." In such a synchro receiver rotation of the magnetic field due to the stator occurs in response to changes in the relative amplitudes between the phases and, if these amplitudes are taken through one complete cycle of changes, the field will be angularly displaced through 360°.

For a fuller discussion of such a synchro receiver, reference is made to "Servo Mechanism Practice" by Ahrendt and Savant, McGraw-Hill, second edition, 1960.

A control system in accordance with this invention may incorporate a synchro receiver of the above type, in which case it is necessary that the output signal from the detector means should be of the synchro type as defined above, that is, of the amplitude-modulated type required in synchro systems, instead of being phase- or freqency-modulated as in the systems described in my previous aforesaid patent and patent application. Various arrangements for producing the required form of signal for synchro control and an arrangement embodying such a control system will now be described with reference to the accompanying drawings.

FIGURES 1 and 2 are explanatory diagrams illustrating the nature of synchro type signals;

FIGURE 3 shows diagrammatically one arrangement for providing such signals;

FIGURES 4 and 4a show diagrammatically an alternative arrangement for providing such signals;

FIGURE 7 is a block diagram of a control system using synchro type signals;

Figure 5A:
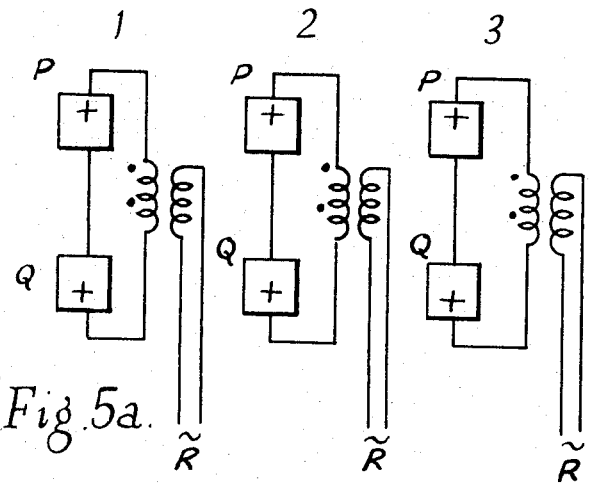
FIGURES 5a and 5b illustrate alternative ways of connecting the photo cells of the arrangement of FIGURE 4.

FIGURES 1 and 2 illustrate diagrammatically the form of signals required in the case of a synchro receiver. FIGURE 1 shows the amplitude and sense of the E.M.F.'s in signals 1, 2 and 3 for various magnetic field displacement angles $a°$, $b°$, and $c°$, while FIGURE 2 shows for each of the three signals the changes in amplitude and polarity with reference to a mean line LL plotted against stator field displacement angle in degrees. From these two figures it will be seen that the three signals keep always in phase or anti-phase with each other, have different amplitudes depending on displacement angle, that the algebraic sum of their amplitudes with reference to the mean line LL at every instant is zero, that their amplitudes are related sinusoidally with displacement angle and that they are equally spaced and reach equal maxima in turn over a complete field displacement cycle.

FIGURE 3 illustrates an arrangement for providing such signals. A pair of relatively movable gratings 10, 11 are superposed in close proximity and produce interference fringes which are illuminated in three equal sections over a fringe cycle by three lamps 12 and the transmitted light from these sections is concentrated on to three photocells 16. The lamps are energised by a common single phase supply 13 and emit fluctuating light at the supply frequency. If filament type lamps are used an additional D.C. biassing supply 14 may also be added to prevent the light from fluctuating at twice the supply frequency, as the signals from the photocells must be of the same frequency as the synchro system and normally a common supply source will be used. Lamps 12 and collimating lenses 15 could be replaced by a single lamp and collimating lens. The output from each cell is proportional to its illumination intensity, which is amplitude modulated by the interference fringes formed by the gratings 10, 11, and these intensities should conform closely to a sine law which is repeated with the passage of each cycle of fringe pattern. Also as the E.M.F.'s generated in the photocells are all mutually in phase, to suit these signals for synchro operation, it is necessary to provide for phase reversal with the passage of fringes as indicated in FIGURE 1, from which it is seen that the amplitude and sense of output signal required from each phase must correspond to intensity of illumination relative to a mean level represented by LL in FIGURE 2. This is accomplished by injecting into the output of each photocell an alternating current from source 17 of fixed amplitude which, when the fringe pattern is stationary, is exactly in anti-phase relationship to the cell outputs and of the supply frequency. The amplitude of this alternating circuit is adjusted to the average amplitude of the signals 1, 2 and 3 from the cells. The three signals are arranged to have mutually equal maxima and minima when similarly illuminated and to be equally spaced over their displacement cycle, see FIGURE 2, that is to say the fringe cycle. Thus, the sum of the amplitudes of the outputs from the cells will be constant and the resultant will be zero, these outputs being in-phase or anti-phase relative to each other. The output signals from the cells may therefore be amplified and applied to the stator of a synchro receiver, the rotor of which is energised by a reference or control signal at the supply frequency; the rotor of the receiver will thus be caused to follow the movement of the fringes.

Figure 5B:
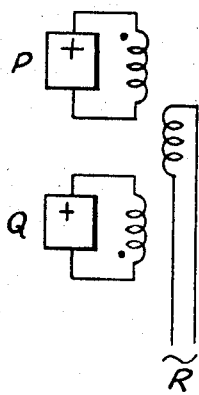
Figure 5C:
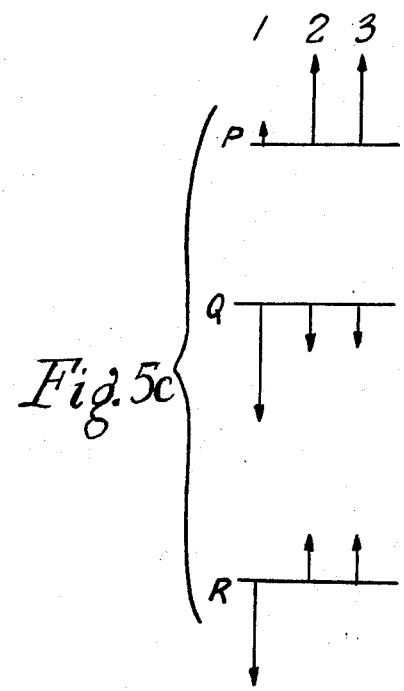
FIGURE 5c is an explanatory diagram.

FIGURE 4 illustrates a second arrangement in which a single lamp 22, energised from an alternating current source 23, is used to illuminate a pair of superposed vernier gratings 18, 19, a collimating lens 20 being interposed between the lamp and the gratings and a set of six de-collimating lenses 24 being interposed between the gratings and the six photo cells 21. One of the gratings, preferably the shorter index grating 19, is a bi-partite grating with two sets of rulings, one set being staggered by half of a line interval in relation to the other so as to produce in combination with the reference grating upper and lower fringe patterns which are relatively displaced by half of one fringe interval. The upper and lower fringe patterns are detected respectively by upper and lower rows of photocells 21, there being three cells in each row. Each cell in the upper row is paired with a corresponding cell in the lower row and the two cells of each conjugate pair are connected back to back or otherwise opposed so that the signals from them are in anti-phase. The pairs of cells are arranged to respond to the light flux across equally spaced portions of the fringe pattern covering one fringe cycle, and, as the upper and lower fringes are relatively displaced by half a fringe interval, any cell which is receiving light of more than the mean intensity is opposed by the other cell of the pair, which receives light of correspondingly less than the mean intensity, and the amplitude of the combined signal from the pair corresponds to the difference between the two light intensities. The sense of the combined signal depends on which cell is receiving the greater amount of light, and with the passage of fringes the outputs from the three pairs of photocells is of the form shown in FIGURES 1 and 2. Alternative ways of connecting the cells are shown in FIGURES 5a and 5b in which the dot convention is used to show the direction of winding on the primary sides of the transformers. In FIGURE 5c, diagrams P and Q illustrate typically amplitudes of signals generated by the three cells in the upper (P) and lower (Q) rows respectively of FIGURE 5a, while diagram R illustrates their resultants at the transformer secondary terminals and the numbers 1, 2 and 3 above the diagrams indicate the pair of cells from which each signal and the resultant derives.

Alternatively the necessity for a bi-partite type of grating can be avoided by shifting the position of the three lenses and their associated cells of one row a distance corresponding to half the fringe interval, with respect to the corresponding cells in the other row, and so connecting the cells of each conjugate pair that the output signal from the pair represents the algebraic difference in amplitude between the two cell signals. The three difference signals together make up the required set of synchro type output signals.

In another arrangement the pair of superposed gratings comprises a reference grating and a vernier index grating which is slightly inclined in relation to the reference grating so as to produce diagonally inclined fringes in the manner described in my aforesaid patent and patent application and as illustrated for example in FIGURE 4a in which the diagonal lines represent light and dark fringes. A collimated light source and a similar arrangement of six lenses and photocells as shown in FIGURE 4 is used, the positions of the rows of lenses and their associated cells however being adjusted so that where any particular cell is receiving maximum illumination its conjugate cell receives minimum illumination as illustrated in FIGURE 4a due to the space between the two rows, that is illumination which is relatively shifted by 180 fringe cycle degrees. In this figure the direction of measured movement is assumed to be horizontal and the cells in the upper row are located 180 fringe cycle degrees above the lower row. To prevent loss of efficiency due to stray illumination in any of the above arrangements, a mask may be interposed in the path of the collimated light, the mask having apertures of suitable size and shape, preferably rectangular, in which the sides parallel to the movement of the fringes approximately equal one third of the fringe interval and in which the other sides are of such length that the diagonal across two corners is parallel to the fringe inclination, in order to admit light only from the appropriate areas of fringe pattern to their corresponding lenses and photocells. Advantages of this arrangement are firstly that the use of a bi-partite grating, or a spread out arrangement of lenses and cells, is avoided; secondly the inclination of the fringes can be readily adjusted by adjusting the inclination of one of the gratings, normally the index grating, and this forms an easy way of accurately balancing the opposing phases of the signals from photo cells forming a conjugate pair, that is to say a precise way of adjusting the spatial phase shift of signals from one row of cells to 180 degrees in relation to the signals from the other row. Thirdly, where coarse gratings are used and operated in close proximity in conjunction with a mask in which square or rectangular apertures are used for reduction of spatial harmonics, it is necessary for satisfactory reductiton of these harmonics that the fringes shall be parallel to the diagonals of the apertures and that each aperture shall span a full third of the fringe interval in the direction of measured fringe movement; this arrangement provides a compact and efficient way of doing this.

Figure 6A:
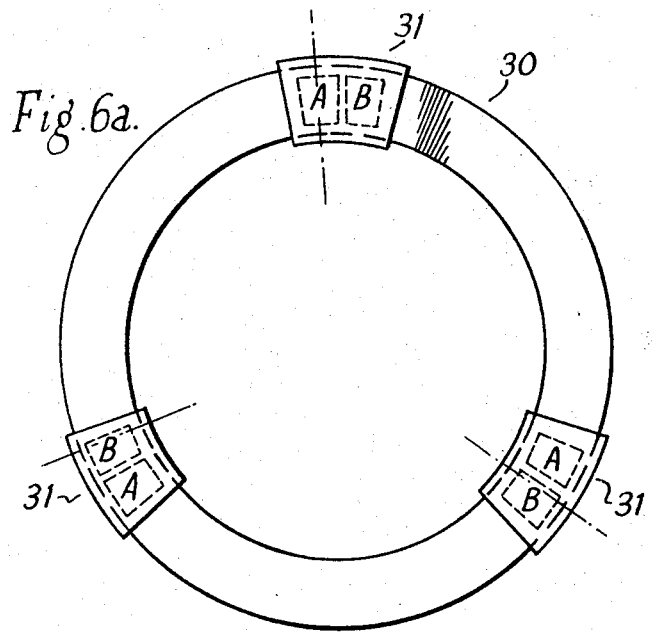
FIGURES 6a and 6b are respectively an end view and a fragmentary perspective view of an arrangement for producing synchro type signals using radially ruled gratings.
Figure 6B:
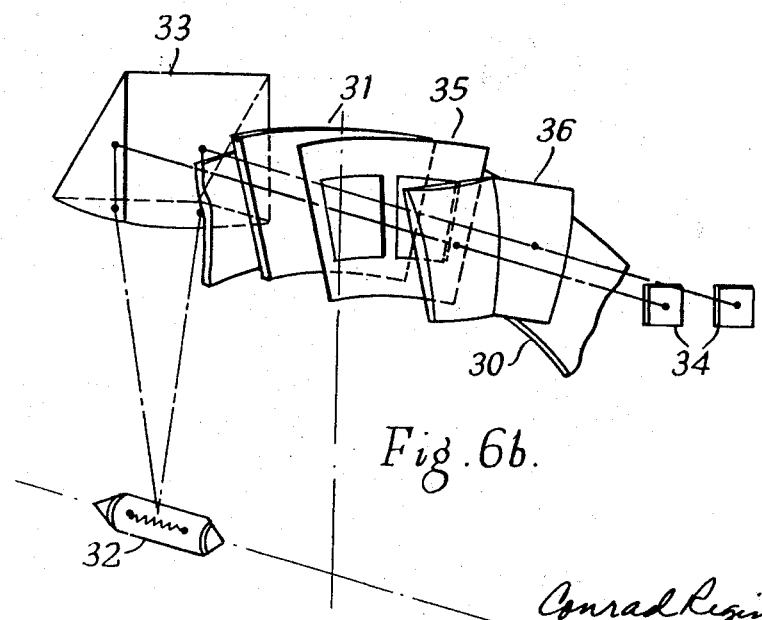

There are many ways in which the above principles may be applied, so long as six elements of the fringe pattern are arranged to generate six signals comprising three opposed pairs which together and in like manner cover the equivalent of 360° of fringe cycle so that they form three output signals of the form illustrated in FIGURE 1, and when modulated by passing fringes change in intensity in the manner illustrated in FIGURE 2. In some applications it may be preferred to group these elements into a compact unit as shown in FIGURE 4, whereas in other applications it may be preferred to form the elements of fringe pattern separately at different points which are widely separated over the reference grating. For example, FIGURE 6 shows an application suitable for following angular movement or position using radially ruled gratings, one of which is a ring or disc forming the reference grating, the other being divided into three separate index gratings. In this application, relative angular movement between the reference grating and the set of index gratings is highly magnified by a large factor corresponding to the number of rulings per 360 degrees on the reference grating. FIGURE 6a is an end view showing the form of the gratings, and FIGURE 6b is a fragmentary perspective view. The gratings comprise a circular reference grating 30 and three short index gratings 31. The gratings being superposed and each having radial lines. The gratings are illuminated from a single alternating current-energised lamp 32 via a combined prism and collimating lens 33 for each pair of cells. The lamp is positioned on the axis of the gratings. Three pairs of photocells 34 are spaced approximately equi-angularly around the axis of the gratings, the cells of each pair being spaced by half a fringe cycle, and the corresponding cells of different pairs being spaced, with respect to the three index gratings, so that, in effect they extend over one fringe cycle. Masks 35 are inserted to define the elemental areas of the fringe pattern from which the photocells are energised, the apertures in the masks each forming a four-sided figure having two substantially straight radially arranged sides and two curved sides whose centres of curvatures lie on or near the axis of the reference grating. In the case of coarsely ruled gratings, in order to reduce spatial harmonics each pair of radial sides of the apertures may be arranged to span an angular distance corresponding closely to 120 degrees of a fringe cycle, the fringes being inclined so that they coincide with one pair of opposite corners of each four-sided aperture. The apertures are arranged in pairs so that A of each pair is spaced by 180 fringe cycle degrees from B, and so that in terms of fringe cycle degrees the three A apertures are mutually spaced at 120 degrees and likewise the three B apertures, thus suitably defining the amplitude and phase of the signals received by the photocells. In the case of finely ruled gratings, where a sine law of fringe intensity is obtained by diffraction, the radial sides of each aperture may be more closely spaced and the fringes aligned radially. The cells of each pair are connected as described with reference to FIGURE 5, and produce an output signal which is either in-phase or anti-phase relative to the alternating current supply and of an amplitude determined by the positions of the fringes relative to the cells. One advantage of this arrangement is that it averages out small errors due to eccentricity between the axis of the system of index gratings, prisms and photocells, and the axis about which the system rotates.

In any of the above arrangements, the fringes can be generated by vernier gratings, crossed gratings or a combination of the two, the lens and cell system being orientated accordingly. The rulings on the gratings can be of any known type; they may be formed by a radial grid with equal line/space ratios and sharply defined edges between the light and dark portions, or shaded according to a required law. Moreover, they can be radial, skew or spiral if required, to provide for coarse or fine measurements. Gratings can be single systems to give one set of signals, or alternatively can be multiple systems in association with multiple optical and electrical systems to give multiple signals of different degrees of coarseness corresponding, for example, to a series of digits in the measuring system.

The gratings can be optical, either transparent or reflecting. Alternatively, they can be of the magnetic type using two magnetic tapes, one for reference and one for index, or one reference tape and an index in the form of rulings on the faces of the poles of the pick-ups, or flux gates, for detecting the magnetic fringes. The tapes can be either of plastic or other non-magnetic material with magnetic coatings, or metal strips of high remanence material magnetised by means of recorded pulses in the required grid pattern. The magnetic fringes, which would be produced by the interference effects of the superposed reference and index gratings, would be analogous to the optical fringes already referred to.

The light source or sources can be of any type producing electromagnetic radiation having an intensity which fluctuates with the alternating current supply. In cases where it is necessary to measure or control high speeds of movement causing the fringes to move rapidly, the light source must be of a type responsive to high energising frequencies; for this purpose a photo-emissive type of light source, such as a gallium arsenide cell, may be used in conjunction with photo cells which are also responsive to such high frequencies, as for example silicon photo-diodes.

Where magnetic gratings are used, the magnetic pick-ups may be of the Hall Multiplier type in which the output voltage from each Hall plate is proportional to the magnetic field through it.

Figure 8:
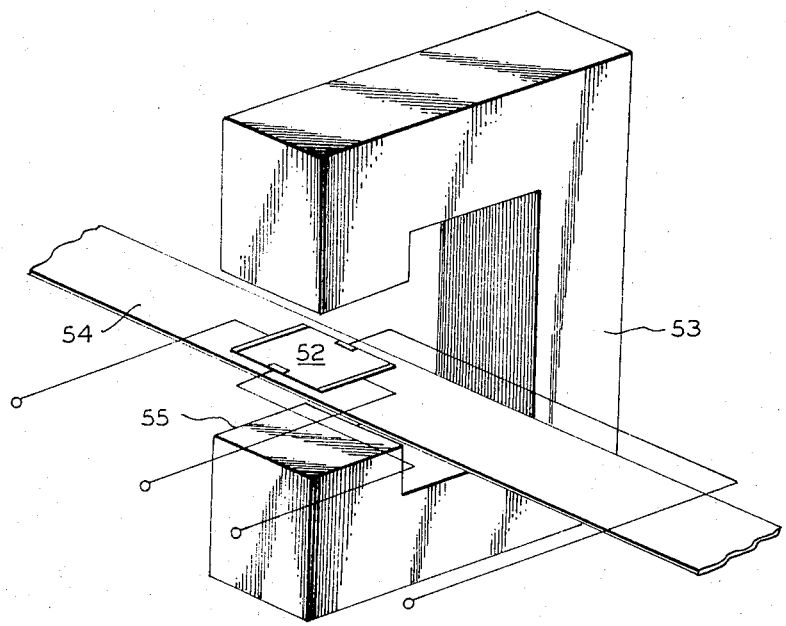
FIGURE 8 illustrates one form of magnetic pick-up using a Hall plate.
Figure 9:
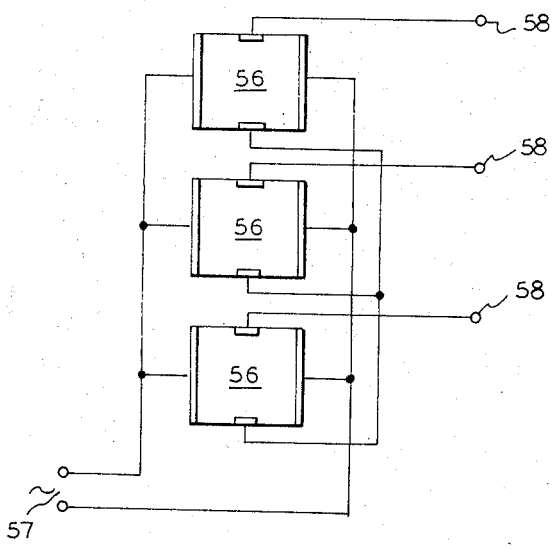
FIGURE 9 is a wiring diagram illustrating the connections for a set of three Hall plates.

FIGURES 8 and 9 illustrate a typical arrangement in which Hall plates are used to detect interference fringes when magnetic gratings are used. As shown in FIGURE 8, a Hall plate 52 is arranged between and parallel with the pole faces of a magnet 53. A reference magnetic grating 54 is movable between one pole face and the Hall plate 52 and this pole face is also formed with an index magnetic grating 55. The current terminals of the Hall plate are supplied from a source of alternating current and the output from the voltage terminals will be modulated by movement of the magnetic interference fringes as the reference grating 54 moves relative to the index grating 55.

A set of three such Hall plates may be used and they may be disposed between the pole faces of the same or different magnets. In either case the arrangement and dimensions are such that each Hall plate "sees" a different third of a fringe cycle. As shown in FIGURE 9, the current terminals of the Hall plates 56 are connected in parallel with a source of alternating current 59 while the voltage terminals are connected in star and the desired output signals are obtained at terminals 58. The arrangement is essentially the same as and operates in all respects in the same way as the optical system described above with reference to FIGURES 1 to 3.

One control system for controlling a process in accordance with a predetermined programme recorded on, for example, magnetic tape, will now be described.

The system includes an arrangement of gratings as described above comprising a reference grating mounted in fixed relation to a stationary member such as a lathe bed and an index grating mounted in fixed relation to a member to be controlled, such as a lathe tool. Movement or displacement of the controlled member gives rise to a corresponding movement or displacement of the fringe pattern relative to the detector means, that is to say, a set of 3 or 6 Hall plates, and three output signals representative of such movement or displacement are derived from the detector means. These three signals are applied to the stator winding of a synchro differential receiver.

A predetermined programme of synchro type signals is recorded on a tape, such as a magnetic tape, which is continuously driven at a speed such that the signals derived from the tape are synchronised with the lathe spindle. The tape carries three recorded signals or three pairs of phase-opposed recorded signals detected by suitable pick-up means, these signals corresponding to the values of the signals which would be derived from the photocells or magnetic pick-ups if the lathe tool were to move in the required manner, and the three signals are applied to the rotor of the synchro differential receiver. As long as the signals due to relative movement of the gratings are the same as the signals derived from the tape, no movement of the differential receiver rotor will be caused. However, if the controlled member, such as the lathe tool, deviates from its programmed movement, the signals from the photocells or pick-ups will differ from the programme signals derived from the tape, and an error signal will be produced and the differential receiver rotor will rotate by an angle proportional to this difference, in a direction tending to reduce the error signal. This rotation, through a servo train of conventional type, for example the control valve in a hydraulic drive, is applied in such a way as to correct the movement of the controlled member.

A further embodiment of the invention, as applied to the control of a lathe required to turn down the diameter of a bar over a given distance in accordance with a programme recorded on a tape, will now be described with reference to FIGURE 7 of the accompanying drawings, which is a block diagram of the control system.

FIGURE 7 shows the workpiece 41 and lathe motor 42 which is connected to a mains supply 43. The cutting tool 44 mounted in a tool carriage 45 is driven by the motor 42 through a suitable drive input 46, for example a hydraulic pump, and control gearing 47, for example a hydraulic valve, is interposed between the input 46 and the drive output for the carriage 45. The programme is recorded on a magnetic tape 48 which passes under a pick-up 49, and a set of three signals from pick-up 49 is applied to the rotor of a synchro differential receiver 50. The position and movement of the tool 44 are measured by a detector or reading head 51, from which signals indicating the actual position and movement of the tool are applied to the stator of the differential receiver 50.

The reading head 51 is a system of the type described in this application energised from, say, a 400 c./s. supply and comprises one or more pairs of relatively moveable gratings, namely a reference grating and an index grating, which produce a pattern of interference fringes the movement and position of which depend upon the movement and position of the tool carriage. The positions of the fringes are detected by photo cells, in the case of optical gratings, or flux gates in the case of magnetic gratings, which produce three output signals. In the case of the tool carriage being stationary, these output signals have a frequency equal to that of the supply, say 400 c./s., but their relative amplitudes differ by amounts depending on displacement of the tool carriage from a datum position. By applying these signals to the stator of a synchro receiver and connecting the rotor to the 400 c./s. supply, the exact position of the tool carriage can be determined. When the tool carriage is moving the fringes move across the photo cells or flux gates at a speed proportional to the speed of movement of the tool carriage, and the output signals produced are amplitude-modulated at a frequency which is proportional to this speed. Thus, the output signals are a measure of the speed of movement of the tool carriage and can be compared with signals derived from the tape having a frequency to correspond with the particular servo system used, in this example 400 c./s., and modulated to correspond with the desired speed. The tape carries three tracks whereby the pick-up 49 produces three output signals corresponding to the output signals from the reading head 51 when the tool is moving or positioned correctly. Thus unmodulated output signals from the pick-up 49 having a frequency equal to the supply frequency, form command signals of fixed relative amplitudes representing a required position of the tool. Similarly, tape signals which carry a programmed series of amplitude changes, that is to say modulation, represent a series of required movements of the tool.

In order to operate the system, the lathe is started and the tool feed rate is set and geared to suit the feed-rate command signals from the tape. The tool is set at its starting position and checked by the reading from the reading head 51. The cut may be started by hand and after being taken a short distance returned to near its starting position. The tool feed is now engaged and the tape is started. The initial signals from the tape comprise three 400 c./s. signals of fixed relative amplitude and will cause the tool to take up its starting position. On the arrival of a new signal from the tape, represented by a modulation of say 30 c./s., the tool carriage will start to move at a speed corresponding to this frequency. If the reference grating of the reading head has 1000 lines per inch, a modulation frequency of 30 c./s. corresponds to a feed rate of 1.8 inches per minute. Any differences between the frequency or relative amplitudes of the command signals derived from the tape and the monitoring signals derived from the reading head, produce a corresponding rotation of the rotor of the differential receiver 50, which is coupled to the control gearing 47, thereby producing a corresponding adjustment to the speed or position of the tool carriage.

The error signals applied to the receiver 50 may operate in either a positive or negative sense, and further the whole operation of the machine table may be originated by the error signals. In other words when the tool feed has been engaged the tool carriage will not move until a change of signal appears, when the differential receiver will initiate the tool movement. In normal running a frequency shift will be continuously present to keep the tool feeding and any variations as between the tape signals and the monitoring signals will be sensed by the differential receiver which will then correct deviations from the programmed feed. Signals from the reading head are also applied to a read-out system, which may be digital or analogue to produce a visual check on the progress of the operation which in this example would be the distance the cut has reached. At the end of the cut, the tape, which should all the time be sending out signals slightly in advance of the tool movements, will revert to an unmodulated signal at the supply frequency causing the tool to stop. Preferably some time is allowed, in the train of signals coming from the tape, for the tool to dwell and finish its cut so that any stresses which might interfere with its accuracy will die out. The error signal will also die out indicating that the correct position has been reached. The tool may now be withdrawn either manually or under the control of a similar system for operating the cross slide. The degree of control will depend on the fineness of ruling of the reference grating, that is to say the degree of control can be reduced while the range of control is increased by a factor of for example ten by using a reference grating which is ruled with 100 lines instead of 1000 lines per inch.

I claim:

1. Apparatus responsive to the movement and position of a member relative to a reference structure comprising a pair of gratings mounted respectively in fixed relation to said member and said reference structure, the gratings being superposed in close proximity for producing a cyclic pattern of interference fringes in an alternating flux field, means defining a plurality of elemental areas of the fringe pattern which areas are relatively displaced in phase with respect to the fringe pattern, a corresponding plurality of detectors responsive to the flux field and each positioned with respect to an associated one of said areas so as to produce an alternating current signal of a frequency equal to the frequency of fluctuating of the flux field and varying in amplitude sinusoidally about a mean amplitude with the passage of each fringe cycle over the associated area, means for combining with each said signal a second signal which is of the same frequency but is in anti-phase with said signal whereby to produce a plurality of synchro type output signals which always remain in phase or anti-phase with one another and are of such relative amplitudes that their resultant is always zero, and a synchro type receiver to which said output signals are applied for producing a read out in accordance with the fringe pattern.

2. Apparatus as claimed in claim 1 wherein the detectors, gratings, and said means defining the elemental areas of the fringe pattern, are so arranged that the output signal from each detector varies sinusoidally with the position of the fringe pattern.

3. Apparatus as claimed in claim 1, wherein each said elemental area of the fringe pattern is in the form of a rectangle, parallelogram, or sector of a ring, the opposing sides of which are spaced by nearly 120 fringe cycle degrees in the direction of fringe movement, and wherein the gratings are arranged so that the fringes lie parallel to a line passing through diagonally opposite corners of said area, the arrangement being such that the output signal from each detector varies substantially sinusoidally with the fringe position.

4. Apparatus as claimed in claim 1, wherein the said signals are each combined with a biasing signal of opposite phase and having an amplitude equal to the said means amplitude.

5. Apparatus as claimed in claim 1, wherein the gratings are optical gratings illuminated by light whose intensity fluctuates in synchronism with a single phase alternating current supply from which the servo means is energised, and wherein the detectors comprise a set of photo cells.

6. Apparatus as claimed in claim 1 wherein the gratings are magnetic gratings and the detectors comprise flux gates or pick-ups which are energized at the same frequency as the synchro type receiver.

7. Apparatus as claimed in claim 1 wherein the gratings are magnetic gratings and the detectors are magnetic multipliers of the Hall effect type which are energized at the same frequency as the synchro type receiver.

8. Apparatus as claimed in claim 1, including means defining a second plurality of elemental areas of the fringe pattern each displaced in phase relative to a corresponding area of the first mentioned plurality of areas by 180° of the fringe cycle pattern, a second plurality of detectors each positioned with respect to an associated one of said second plurality of areas, means for connecting together in pairs a detector of the first-mentioned plurality of detectors and a detector of said second plurality of detectors such that the detectors of a pair are associated with areas of the fringe pattern which are displaced in phase by 180°, and means for combining the signals from a pair of detectors to provide an output signal of amplitude equal to the difference between the amplitudes of the signals from the two detectors of the pair.

9. Apparatus as claimed in claim 8, wherein said combining means comprise a transformer having two primary windings each receiving signals from a respective detector and a secondary winding from which said output signal is derived.

10. Apparatus as claimed in claim 1, wherein the synchro type receiver is a synchro differential receiver to one set of windings of which the said output signals are applied, and including means for deriving a set of pre-recorded alternating current control signals according to the desired position of said member and corresponding in number and type to said output signals, said control signals being applied to another set of windings of said receiver so that said receiver responds to discrepancy between said output signals and said control signals, and means controlled by said receiver for effecting a correcting movement of said member.

11. Apparatus as claimed in claim 10, wherein the control signals are pre-recorded on a magentic record carrier in accordance with a predetermined programme of movement of said member.

12. Apparatus as claimed in claim 10, including a frequency sensitive device for determining the frequency components of the output signals from the detectors whereby to determine the speed of movement of said member relative to the reference structure.

References Cited

UNITED STATES PATENTS

| | | | |
|---|---|---|---|
| 3,165,679 | 1/1965 | Angus et al. | 250—220 X |
| 2,651,746 | 9/1953 | Gano | 318—55 |

OTHER REFERENCES

Standard Handbook for Electrical Engineers, 8th ed., McGraw-Hill, New York, 1949, section 19–312 on page 1921 relied upon.

RALPH G. NILSON, Primary Examiner.

T. N. GRIGSBY, Assistant Examiner.

U.S. Cl. X.R.

88—14; 250—209, 220; 318—20.100, 20.102, 20.605